(12) United States Patent
Bourgeois-Potage et al.

(10) Patent No.: US 8,181,567 B2
(45) Date of Patent: May 22, 2012

(54) HIGH-THROUGHPUT CENTRIFUGE

(75) Inventors: Patrice Jean Marcel Bourgeois-Potage, Montceau les Mines (FR); Lic Xavier Fevre, Sanvignes les Mines (FR)

(73) Assignee: Hameur SA, Luxembourg (LU)

( * ) Notice: Subject to any disclaimer, the term of this patent is extended or adjusted under 35 U.S.C. 154(b) by 389 days.

(21) Appl. No.: 12/579,835

(22) Filed: Oct. 15, 2009

(65) Prior Publication Data
US 2010/0089253 A1   Apr. 15, 2010

(30) Foreign Application Priority Data
Oct. 15, 2008   (FR) ...................................... 08 56996

(51) Int. Cl.
*A23N 1/02*   (2006.01)
*A23N 1/00*   (2006.01)

(52) U.S. Cl. ......... 99/513; 99/511; 210/360.1; 210/369; 241/92; 241/282.1; 241/292.1

(58) Field of Classification Search ................... 99/510, 99/511, 513; 210/360.1, 369; 241/92, 282.1, 241/282.2, 292.1; 366/205, 206
See application file for complete search history.

(56) References Cited

FOREIGN PATENT DOCUMENTS

| | | |
|---|---|---|
| EP | 0 684 000 A | 1/1995 |
| FR | 2 182 795 A | 12/1973 |
| FR | 2 338 679 A | 8/1977 |
| GB | 771 209 A | 3/1957 |
| GB | 796 882 A | 6/1958 |
| WO | WO-2005/009186 A | 2/2005 |

*Primary Examiner* — Reginald L Alexander
(74) *Attorney, Agent, or Firm* — IM IP Law PLLC; C. Andrew Im

(57) ABSTRACT

The invention relates to an apparatus for preparing foods, aimed at creating fruit and/or vegetable juice from whole or chopped fruits and/or vegetables, by grating and centrifugation, including in particular: a grating disc; a basket connected to the grating disc, linked to a drive shaft, comprising in particular a filter ring and a hub; a cover, fitted with a food introduction conduit, the conduit substantially having the shape of a cylindrical tube with a circular, oval or oblong base. The purpose of the invention is to offer improvements enabling juice to be produced with a high throughput. These improvements consist in particular of an introduction conduit comprising an element for holding foods and a grating disc inclined with respect to its rotation axis.

12 Claims, 6 Drawing Sheets

HIGH-THROUGHPUT CENTRIFUGE

RELATED APPLICATION

This application claims priority from French Patent Application No. 08 56996 filed Oct. 15, 2008, incorporated by reference in its entirety.

TECHNICAL FIELD OF THE INVENTION

This invention relates to an apparatus for preparing foods, aimed at creating fruit and/or vegetable juice from whole or chopped fruits and/or vegetables, by grating and centrifugation. More particularly, the invention relates to a centrifuge-type apparatus.

The purpose of the invention is to offer improvements with respect to the prior art, enabling high-throughput apparatus to be obtained.

BACKGROUND OF THE INVENTION

A centrifuge-type apparatus has the function of separating the fruit and/or vegetable juice from the solid matter of said fruits and/or vegetables. This separation is performed in particular by finely grating the foods by means of a grating disc; then, the centrifugal force generated by the rotation of an element of the apparatus passes the juice of the grated foods through a filter, which retains the pulp. This type of apparatus exists in electrical household appliance ranges. It is also used in a classic manner for group catering, for example in restaurants and bars.

A centrifuge-type apparatus comprises in particular the following elements: a grating disc, fitted with grating means; a basket connected to the grating disk, linked to a drive shaft, comprising in particular a filter ring and a hub; a cover, fitted with a food introduction conduit. In a classic manner, the conduit substantially has the shape of a cylindrical tube with a circular, oval or oblong base.

In group catering, it is often necessary to quickly produce large quantities of fruit and/or vegetable juice. The user can thus find him/herself confronted with several disadvantages linked to known apparatus from the prior art.

OBJECTS OF THE INVENTION

One of the main problems is in particular posed by the introduction conduit. Advantageously, the conduit must be capable of accommodating whole fruits and/or vegetables in order to avoid the user being required to chop them into pieces. This problem is resolved by a large-scale conduit.

In addition, for the majority of known apparatus from the prior art, the foods bounce off of the rotating disc or roll along the internal wall of the introduction conduit. These interfering movements penalise the intake of the grating means. A pusher must therefore be used, enabling the foods to be compressed against the grating disc in order for the apparatus to operate efficiently. This pushing step interrupts the user from introducing the foods into the conduit, and therefore reduces throughput. In addition, a large-scale introduction conduit generally implies an apparatus of substantial height. The user is often obliged to lift up his/her arms in order to use the pusher. He/she must therefore use a pulling motion to work the pusher instead of a pushing motion, which requires more effort.

It would therefore be more interesting to provide for an introduction conduit comprising one or several means for preventing the rotation of the foods, as well as one or several means for pushing the foods against the grating disc. Such a conduit would not require the need for a pusher, which would improve throughput.

Another problem encountered with apparatus from the prior art, is the poor grating result obtained in the central area of the grating disc. Indeed, the stress exerted by the grating disc on a food item is lower near the centre than near the periphery of said grating disc. A piece of a fruit or vegetable can become lodged on the grating means located in the centre of the disc.

It is therefore advantageous to provide for a grating disc capable of drawing the foods to its periphery. One purpose of the invention is to resolve this problem by inclining the grating disc with respect to a plane perpendicular to a rotation axis of said grating disc.

In addition, an inclined grating disc can cooperate with an introduction conduit comprising one or several means for preventing the rotation of the foods, as well as one or several means for pushing the foods against the grating disc. Indeed, the incline of the grating disc can enable the foods to be directed towards these means for preventing their rotation and for pushing them against the grating disc.

Another problem encountered with apparatus from the prior art, is the coating of the inside of the cover with pulp produced by the grating of the foods. When ejection of the solid matter is not efficient enough, the pulp accumulates around the basket, which reduces the throughput and can even cause the blocking of the apparatus.

Another problem encountered with apparatus from the prior art, is the difficulty in detaching the basket from its drive shaft for cleaning purposes.

One purpose of the invention is to resolve these problems by providing for catches located above the upper part of the ring. These catches have in particular the function of providing a handhold for removing the basket. When the apparatus is in operation, these catches also have the function of driving away the pulp capable of accumulating on the inside of the cover.

Another problem encountered with apparatus from the prior art, is linked to the wear of seal parts. A centrifuge comprises in particular a motor unit which rotates the drive shaft. This motor unit must be isolated from the outside of the apparatus. Indeed, infiltrations, in particular from juice, inside of said motor unit would lead to serious degradations of the apparatus.

This isolation of the motor unit is in particular ensured by a seal ring encircling the drive shaft, underneath the part of said shaft that fits into the basket hub. The drive shaft rotates freely with respect to said seal ring. The part of the drive shaft in contact with the seal ring must therefore have a circular profile.

In order to control the wear of said seal ring, it is very advantageous for it to be visible without requiring the apparatus to be fastidiously dismantled. Similarly, it is very advantageous to be able to easily change said seal ring.

The invention has resolved this problem by using a drive shaft substantially having the shape of a cylinder with a circular base. This circular shape, in particular in contrast to a hexagonal base, enables the seal ring to be added and removed by simply sliding it on the shaft. It is also simpler to create than with a shaft with a hexagonal profile, which would require additional machining.

The basket is rotated by the drive shaft via the intermediary of a pin, permanently mounted onto the drive shaft. The pin is located in a hollow of the basket hub.

However, the Applicant noticed that, when said hollow has a dimension close to that of the pin, the start-up of the apparatus causes vibrations which are extremely annoying, linked to the beating of the pin against both parts of the hollow.

In a surprising manner with respect to the solutions used in the prior art, the invention has resolved this problem by increasing the size of the hollow. The pin has a larger clearance area, which prevents it from beating against both parts of the hollow when the apparatus is in operation.

SUMMARY OF THE INVENTION

One purpose of this invention is therefore an apparatus for preparing foods, aimed at creating fruit and/or vegetable juice from whole or chopped fruits and/or vegetables, by grating and centrifugation, including in particular: a grating disc; a basket connected to the grating disc, linked to a drive shaft, comprising in particular a filter ring and a hub; a cover, fitted with a food introduction conduit, said conduit substantially having the shape of a cylindrical tube with a circular, oval or oblong base; characterised in that the food introduction conduit comprises at least one means for preventing the rotation of the foods and at least one means for pushing the foods against the grating disc.

Preferably, the food introduction conduit is essentially constituted from two cylindrical tubes with parallel axes, one of said internal tubes being tangent to the other external tube, said internal tube being partially cut up according to an edge, said edge serving as a support to a sequence of surfaces also attached to the internal wall of said external tube, said surfaces constituting a means for preventing the rotation of the foods and/or a means for pushing the foods against the grating disc.

Preferably, a means for preventing the rotation of the foods and for pushing the foods against the grating disc comprises a surface substantially turned towards the grating disc, this surface having the shape of a strip, of which one edge is wound up in a helical manner against the internal wall of the external tube of the conduit.

Preferably, the length of the helical coil is between ⅓ and ⅔ of a spiral, an average coil pitch being between 1 and 1.5 times the total height of the external tube of the conduit.

Preferably, the helical coil has a changing pitch, which progressively increases the higher up in the interior of the conduit.

Preferably, according to a planigraphic plane passing by an axis of the external tube of the conduit, the internal edge of the strip forming the helical coil is closer to the grating disc than the external edge of the strip forming the helical coil.

Preferably, the means for pushing the foods against the grating disc comprises a substantially planar and substantially horizontal surface, located within the conduit area closest to the grating disc, extending the strip with an edge wound up in a helical manner.

Preferably, the substantially horizontal surface comprises a tongue, accentuated with respect to a vertical internal surface of the internal tube of the conduit.

Preferably, a means for preventing the rotation of the foods comprises a substantially planar and substantially vertical surface, of which one of the edges rests against the internal wall of the external tube of the conduit, said surface forming an angle comprised between 60 and 90° with a plane tangent to the external tube at the level of a contact point between the edge of said surface and the internal wall of the external tube.

Preferably, the substantially vertical surface is located within the extension, towards the conduit inlet, of a surface having the shape of a strip with an edge wound up in a helical manner against the internal wall of the external tube.

Preferably, according to a view perpendicular to a rotation axis of the grating disc, the introduction space for the foods at the conduit inlet is off-centre with respect to said rotation axis of the grating disc.

In addition, one purpose of this invention is an apparatus for preparing foods, aimed at creating fruit and/or vegetable juice from whole or chopped fruits and/or vegetables, by grating and centrifugation, including in particular: a grating disc; a basket connected to the grating disc, linked to a drive shaft, comprising in particular a filter ring and a hub; a cover, fitted with a food introduction conduit, said conduit substantially having the shape of a cylindrical tube with a circular, oval or oblong base; characterised in that when in operation, the grating disc is inclined with respect to a plane perpendicular to a rotation axis of said disc.

Preferably, a plane of the grating disc forms an angle comprised between 0.5° and 2° with a plane perpendicular to a rotation axis of said disc. Preferably, said angle is between 1° and 1.5°.

Preferably, the incline of the grating disc is created by means of a wedge attached to the underside of said disc, said wedge having an upper side and an underside located in two non-parallel planes, said underside being perpendicular to a rotation axis of the wedge.

In addition, one purpose of this invention is an apparatus for preparing foods, aimed at creating fruit and/or vegetable juice from whole or chopped fruits and/or vegetables, by grating and centrifugation, including in particular: a grating disc; a basket connected to the grating disc, linked to a drive shaft, comprising in particular a filter ring and a hub; a cover, fitted with a food introduction conduit, said conduit substantially having the shape of a cylindrical tube with a circular, oval or oblong base; characterised in that the filter ring of the basket comprises at least two catches located above an upper part of the ring.

Preferably, when said apparatus is in operation, the catches are located at a distance from the cover less than a thickness of said catches, and have in the space a shape substantially complementary to an internal part of said cover.

Preferably, the catches are bent and turned towards a rotation axis of the basket.

In addition, one purpose of this invention is an apparatus for preparing foods, aimed at creating fruit and/or vegetable juice from whole or chopped fruits and/or vegetables, by grating and centrifugation, including in particular: a grating disc; a basket connected to the grating disc, linked to a drive shaft, comprising in particular a filter ring and a hub; a cover, fitted with a food introduction conduit, said conduit substantially having the shape of a cylindrical tube with a circular, oval or oblong base; characterised in that: the drive shaft substantially has the shape of a cylinder with a circular base; the drive shaft rotates the hub by the intermediary of a pin mounted onto said shaft; a hollow of the hub aimed at accommodating the pin, has a shape such that a length of an arc that an external edge of the pin can draw in rotation in said hollow is equal to at least double the width of said external end of the pin.

Preferably, a hollow of the hub aimed at accommodating the drive shaft substantially has the shape of a cylinder with a circular base, a length of said cylinder being comprised between 3 and 4 times the diameter of said circular base.

Preferably, the hollow comprises an elastomer insert, said insert forming at least one part of the hollow of the hub aimed at accommodating the pin.

Preferably, the pin comprises a means for attaching itself to the drive shaft in a non-permanent way, said means for example being a thread.

BRIEF DESCRIPTION OF THE DRAWINGS

The invention will be better understood after reading the following description and after examining the accompanying figures. These are presented as a rough guide and in no way as a limited guide to the invention.

DETAILED DESCRIPTION OF THE EMBODIMENTS

In the following description, the directional indications such as high, low, horizontal, vertical, lower, upper, etc. are to be considered for the apparatus in an operating position. This position is such that the foods are introduced into the apparatus by gravitational force.

Figure 1:
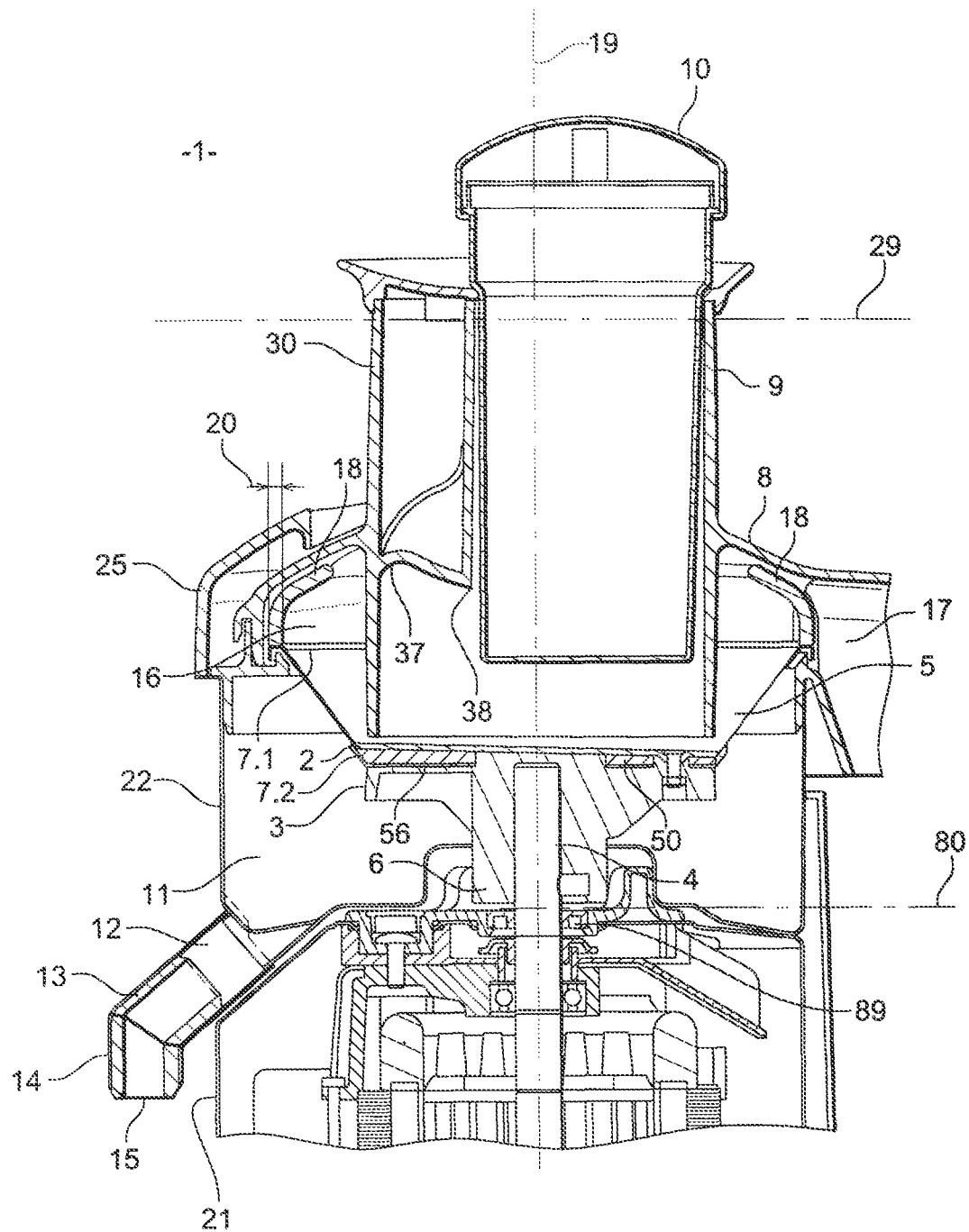
FIG. 1: a partial, cross-sectional view of a centrifuge according to a preferable form of embodiment of the invention.

FIG. 1 presents a preferable mode of embodiment of a centrifuge according to the invention. Said centrifuge 1 comprises in particular a grating disc 2, a basket 3 connected to the grating disc, linked to a drive shaft 4, comprising in particular a filter ring 5 and a hub 6. Filter ring 5 is surrounded by an upper collar 7.1 and by a lower collar 7.2. Centrifuge 1 also comprises a cover 8 fitted with a conduit 9 for introducing the foods.

The foods, in particular fruits or vegetables, are introduced into conduit 9. They are then finely grated by grating disc 2. In order to compress the foods against disc 2, the user can use a pusher 10. In any event, the invention provides for means enabling the user to avoid using said pusher 10. These means will be described in more detail hereinafter.

Due to the rotation of basket 3, the foods grated by disc 2 are projected onto an internal wall of filter ring 5. This filter ring comprises a fine grill which retains the pulp, that is to say the solid matter of the grated foods. The centrifugal force generated by the rotation of basket 3 enables the juice from the foods to be extracted from the pulp and be passed into a chamber 11. The juice therefore drains towards the outside via a conduit 12.

According to a preferable form of the invention, conduit 12 is fitted with a nozzle comprising two parts. One part 13 of said nozzle is fitted into conduit 12 or around conduit 12. The other part 14 of said nozzle forms a bend with part 13. Part 14 can be manually pivoted around an axis of part 13. When the user wants to collect the juice, he/she turns an orifice 14 of part 14 downwards, as represented in FIG. 1. When the user wants to stop collecting the juice, he/she turns orifice 15 of part 14 upwards. This position avoids drops of juice escaping from the apparatus and soiling the work surface supporting centrifuge 1.

When the apparatus is in operation, the pulp retained by filter ring 5 slowly fills a space 16, located between basket 3 and cover 8. The centrifugal force generated by the rotation of basket 3 contributes to ejecting the pulp towards a part 17 of the cover, which surmounts a pulp-collecting recipient (not represented).

When a too large quantity of pulp coats space 16, the functioning of the apparatus is disturbed. It is therefore advantageous to fit ring 5 with catches 18. By running over the inside of the cover during the rotation of basket 3, said catches 18 prevent the pulp from accumulating on the internal side of cover 8. Catches 18 are located underneath an upper part of ring 5.

In order to maintain balance during the rotation of the basket, catches 18 are advantageously positioned in a symmetrical manner. In the example represented in FIG. 1, there are two catches 18, substantially located on a plane passing by a rotation axis 19 of basket 3. These catches 18 have a symmetrical shape and disposition with respect to said rotation axis 19 of basket 3. According to other embodiments of the invention, a higher number of catches can be installed, for example three or four. These catches can be positioned at the points of a regular polygon (equilateral triangle, square, etc.) the centre of which is located on rotation axis 19 of basket 3.

In order to efficiently prevent the pulp from accumulating on an internal side of cover 8, it is advantageous that catches 18 are located a small distance from said cover 8 in operating position. Preferably, when centrifuge 1 is in operation, catches 18 are located at a distance from cover 8 less than a thickness 20 of said catches 18.

Preferably, the shape of catches 18 is such that when centrifuge 1 is in operation, catches 18 have in the space a shape substantially complementary to an internal part of cover 8. In the example represented in FIG. 1, catches 18 have in the space, a shape substantially complementary to the part of cover 8 that surmounts space 16. In this manner, catches 18 prevent the pulp from accumulating under the internal wall of cover 8, which eases the ejection of said pulp towards a pulp collecting recipient.

Due to the small clearance between drive shaft 4 and hub 6, it can be difficult to remove basket 3 for cleaning. In an advantageous manner, catches 18 have a shape providing an efficient handhold during the dismantling of basket 3 from its drive shaft 4. Preferably, catches 18 have a bent shape. More preferably, a part of the bend, of which one end is attached to filter ring 5, is substantially vertical; another part of the bend is turned towards rotation axis 19 of basket 3. Advantageously, in order to offer a more efficient hand grip, an internal angle of the bend is less than or equal to 115°. The gripping ability on such catches 18 greatly eases the dismantling of basket 3 and of drive shaft 4 by a user.

Figure 2:
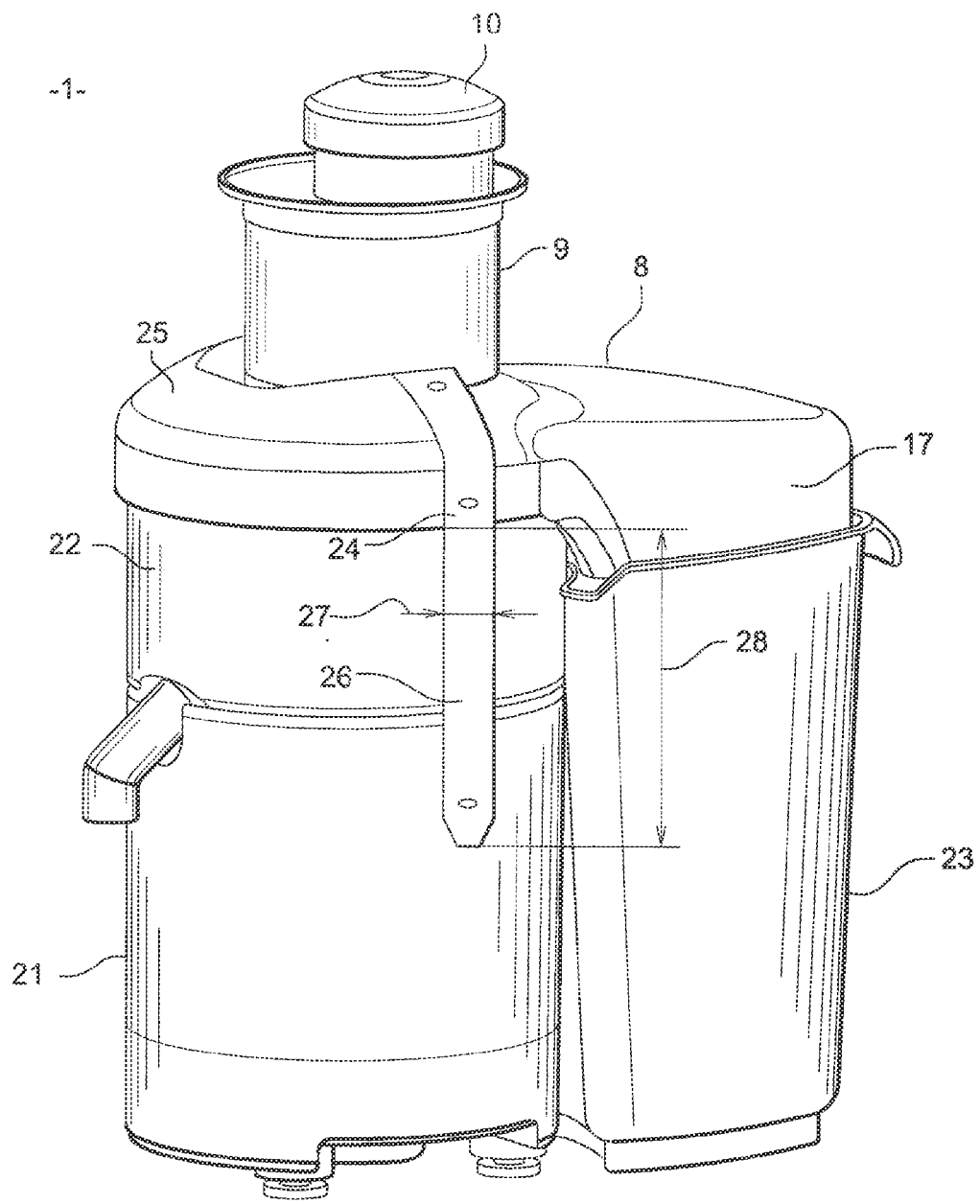
FIG. 2: an overall view of a centrifuge according to a preferable form of embodiment of the invention.

FIG. 2 represents a prospect view of a centrifuge 1 such as represented in FIG. 1. A body 21 is distinguished, containing in particular a motor unit linked to drive shaft 4. A vat 22 is also distinguished, which defines juice collecting chamber 11. Cover 8, conduit 9, pusher 10, as well as pulp collecting recipient 23 are also distinguished, the latter enabling the pulp ejected from basket 3 to be stored. Recipient 23 is not attached to the rest of centrifuge 1. Said recipient 23 simply fits around part 17 of cover 8. The user can therefore easily remove this recipient 23 for emptying.

Cover 8 is held in place on top of the body 21/vat 22 unit, by means of a clip 24. This clip comprises a handle 25, with a shape substantially complementary to an external part of cover 8. In an operating position, handle 25 is in contact with cover 8 and holds said cover 8 in position on top of vat 22.

Clip 24 also comprises two arms 26, mounted in rotation on body 21 and located on either side of said body 21. Advantageously, arms 26 are formed from a band, preferably metallic. A width 27 sufficiently significant with respect to a length 28 of the band provides better resistance to torsion when moving clip 24 to add/remove cover 8.

Figure 3:
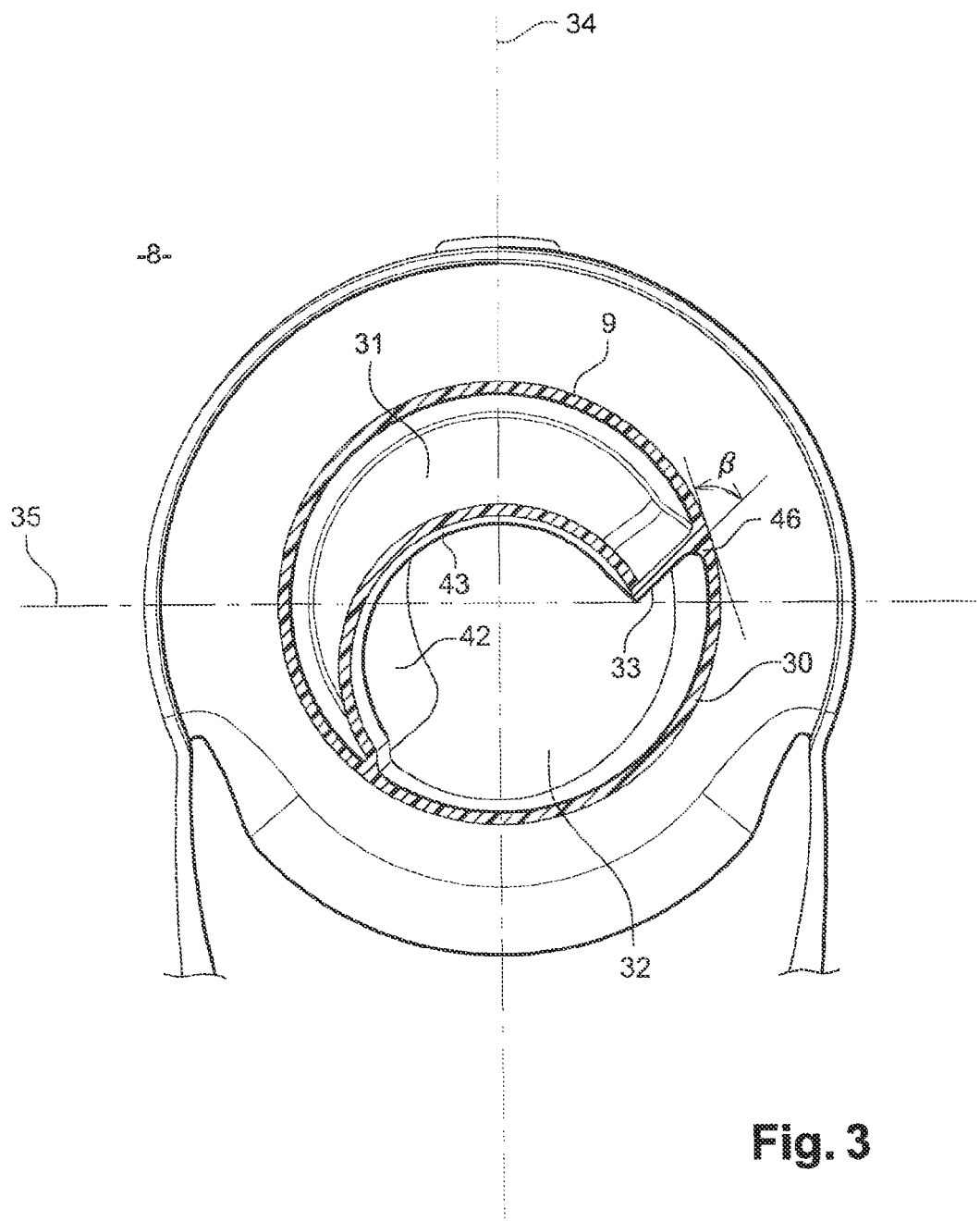
FIG. 3: a partial, cross-sectional view of a cover of a centrifuge according to a preferable form of embodiment of the invention.

FIG. 3 represents a partial, cross-sectional view of cover 8, according to a planigraphic plane perpendicular to axis 19 and passing by axis 29 represented in FIG. 1.

In the example of embodiment represented in FIG. 3, introduction conduit 9 is formed from two cylindrical tubes with a substantially circular base. Internal tube 43 is tangent to external tube 30. As shown in FIG. 1, axis 19 of tube 30 passes by the centre of grating disc 2. The circle radius forming the base of said tube 30 is substantially identical to that of grating disc 2.

According to the planigraphic plane of FIG. 3, the profile of the two tangent tubes 30 and 43 define an area 31 in the shape of a crescent. In the example represented in FIG. 3, one of the points of the crescent is truncated.

According to the planigraphic plane of FIG. 3, a space 32 for introducing the foods into the conduit therefore has a profile with a substantially disc shape, to which is added the part complementary to the truncated point of the crescent, said complementary part being defined by a wall 33 and by the internal wall of tube 30.

Space 32 is off-centre with respect to a centre of the circle forming the base of tube 30. Space 32 is therefore off-centre with respect to rotation axis 19 of grating disc 2, said axis 19 passing by a centre of the circle forming the base of tube 30.

In FIG. 3, two axes 34 and 35, perpendicular to each other are represented. As a planigraphic plane, FIG. 1 has a plane passing by rotation axis 19 and axis 34 of basket 3.

Figure 4:
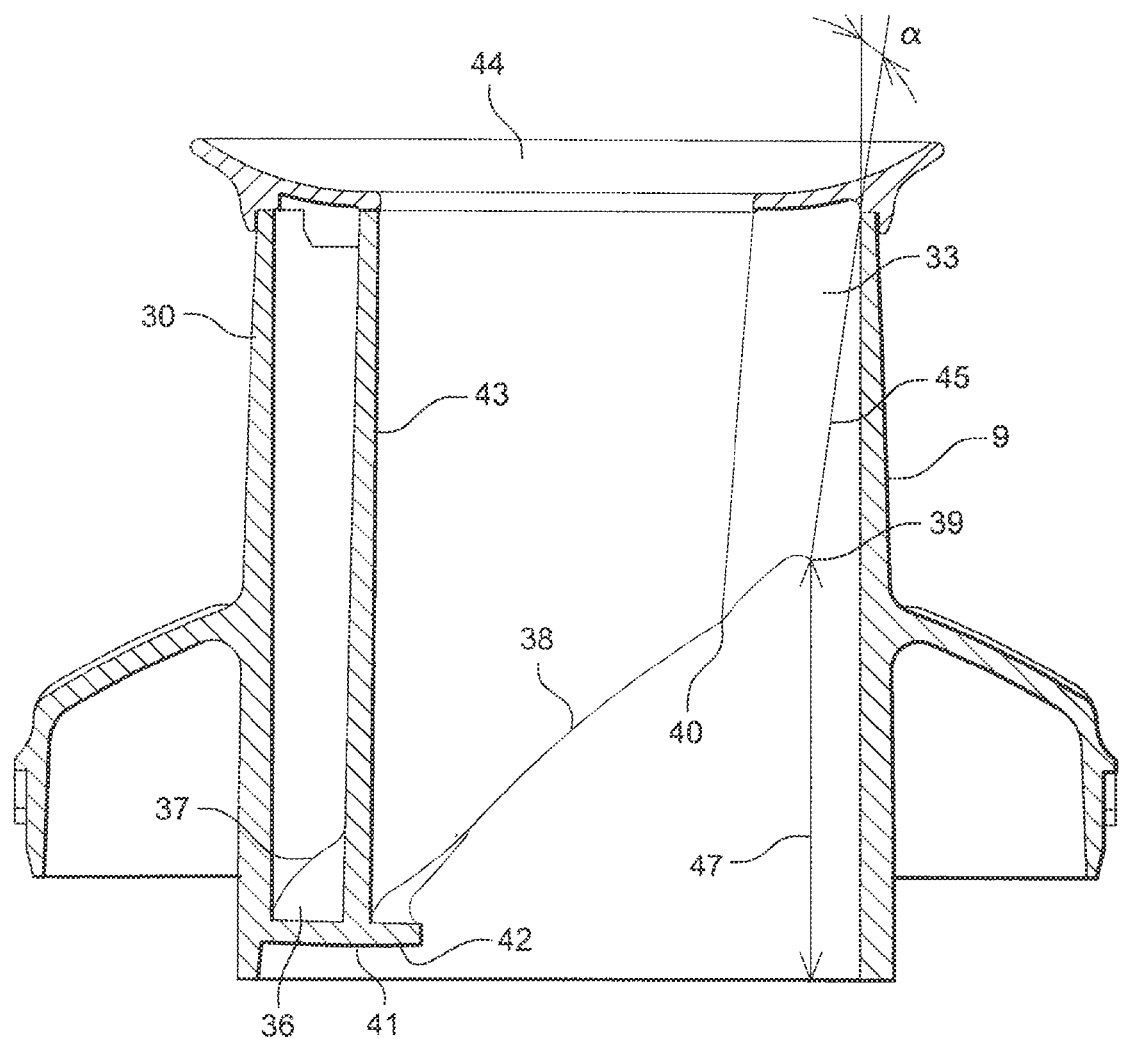
FIG. 4: another partial, cross-sectional view of a cover of a centrifuge according to a preferable form of embodiment of the invention.

FIG. 4 represents a cross-sectional view of cover 8 according to a plane passing by rotation axis 19 and axis 35 of basket 3. In this figure, the inside of food introduction conduit 9 is distinguished. The inside of conduit 9 comprises in particular a strip 36, of which one edge 37 is wound up in a helical manner against the internal wall of tube 30, forming the outside of conduit 9.

An underside of strip 36, said underside being substantially turned towards grating disc 2, has the function of avoiding the upwards ejection of the foods introduced into the conduit. The underside of strip 36 also has the function of stopping the rotation of, and compressing the fruits and/or vegetables against the disc, in particular for large fruits such as apples. Grating disc 2 turns in an anti-clockwise direction, according to the plane in FIG. 3. The rotation of disc 2 leads the foods to pass under strip 36. Said strip 36 therefore plays the role of a slide by guiding the foods ever closer to the disc, according to a descending helical movement.

As is also shown in FIG. 1, an edge 38 of strip 36, inside the helical coil, is closer to grating disc 2 than an edge 37 of strip 36, outside of the helical coil. Preferably, this difference in height between the two edges (37, 38) is progressively reduced as strip 36 gets closer to grating disc 2. This difference in height is in particular more significant between the upper ends (39, 40) of edges (37, 38) (FIG. 4) than between edges (37, 38) according to the planigraphic plane in FIG. 1.

This difference in height between edges (37, 38) contributes to drawing the foods to be grated towards the periphery of grating disc 2. The grating is indeed more efficient at the periphery of disc 2 than towards the centre of said disc 2.

In its lower part, that is to say the closest part to grating disc 2, strip 36 ends with a surface 41 substantially planar and substantially horizontal. Surface 41 comprises a tongue 42, accentuated with respect to a vertical internal surface of the internal tube 43. This tongue 42 is also visible in FIG. 3 from an overhead view.

Surface 41, in particular tongue 42, has the function of compressing the foods arriving at the lower end of the slide against grating disc 2, the slide being formed by an underside of strip 36.

At the level of the truncate point of the crescent formed by area 31, strip 36 is extended by surface 33 in the direction of an inlet 44 of conduit 9 (FIG. 4). Said surface 33 is substantially planar. One of its edges 45 rests against the internal wall of tube 30. Surface 33 is substantially vertical. It can in any case present an angle α with the vertical. Said angle cc is open in the direction of disc 2, in the direction of rotation of said disc 2. Thus, the slope formed by surface 33 is turned towards disc 2 and not towards inlet 44 of conduit 9. Preferably, the angle α is between 0° and 30°.

As shown in FIG. 3, surface 33 forms an angle β with a plane tangent to tube 30 at the level of a contact point 46 between an edge 45 of said surface 33 and the internal wall of tube 30. Preferably, said angle β is between 60° and 90°.

Surface 33 has the function of keeping certain long and fine foods from rotation, for example carrots, by preventing them from rolling against the internal wall of conduit 9. Said foods are thus easily accommodated by grating disc 2. The angle β is less than or equal to 90° so as to enable the foods to be better maintained. The slope formed by surface 33 is turned towards grating disc 2 in order to lead the foods towards the slide formed by strip 36.

According to a preferable form of the invention, the length of the helical coil of strip 36 is between ⅓ and ⅔ of spiral. In the example represented in FIG. 3, it can be observed that this length is the equivalent to approximately ½ of a spiral.

An average coil pitch is comprised between 1 and 1.5 times the total height of tube 30. In this manner, a height 47 (FIG. 4), at the upper end of strip 36, can be sufficient to accommodate several sorts of fruit and/or vegetables introduced whole, in particular apples.

Preferably, the helical coil of strip 36 has a changing pitch. Said pitch progressively increases the higher up in the inside of conduit 9. The pitch is low near to substantially horizontal surface 41. It is higher near to the junction between surfaces (36, 33).

A width of strip 36, defined by a distance between edges (37, 38) can be variable along the coil of strip 36. According to a preferable form of the invention, an average width of strip 36 is comprised between ⅓ and ⅔ of the radius of grating disc 2.

Figure 5:
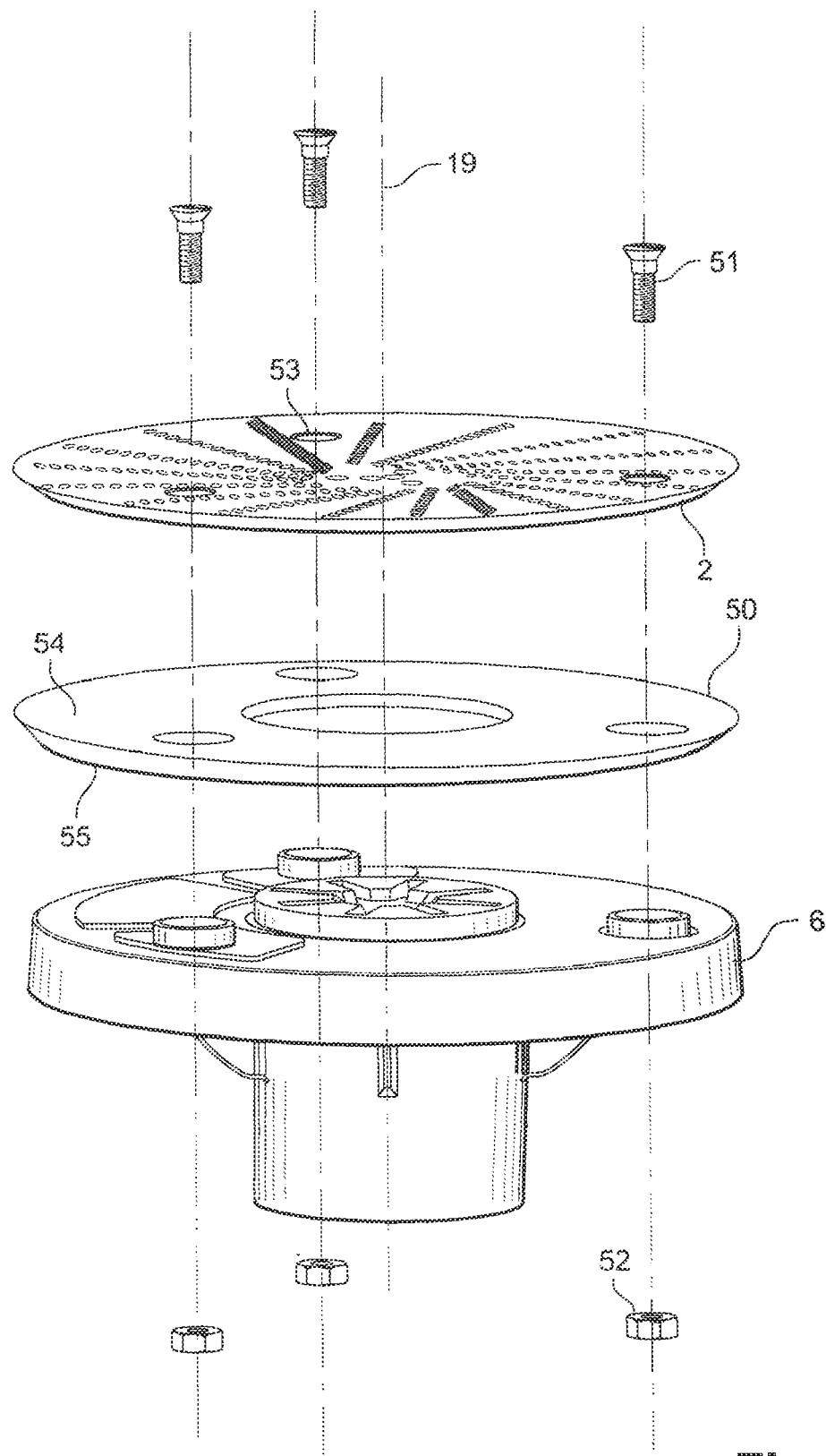
FIG. 5: a broken-down view of a hub/grating disc unit of a centrifuge according to a preferable form of embodiment of the invention.

FIG. 5 represents a broken down view of the grating disc 2/hub 6 unit. According to the invention, when in operating position, grating disc 2 is inclined with respect to a plane perpendicular to a rotation axis 19 of said disc 2. This incline can be created by means of a disc 2 with an upper side and an underside being not parallel to each other. In any case, this solution presents manufacturing difficulties.

Preferably, the incline of grating disc 2 is created by means of a wedge 50 attached to the underside of disc 2, said wedge 50 having an upper side 54 and an underside 55 located in two non-parallel planes. The underside 55 of wedge 50 is perpendicular to rotation axis 19 of said wedge.

This incline communicates a vertical wave movement to the foods compressed against disc 2. This movement makes any blocking position in the centre of the disc unstable, in the area where the grating means are the least efficient. The centrifugal action of disc 2, when combined with the wave movement, enables the foods to be drawn towards the periphery of said disc, that is to say in the area where the grating means are the most efficient.

In addition, this incline of disc 2 enables cooperation with the introduction conduit described above (FIGS. 3 and 4). Indeed, the incline of disc 2 draws the foods to the intake areas of the means for stopping the rotation and for compression, in particular in the intake area of the foods by slide 36.

Said incline also modifies the angle of attack of the grating means located on disc 2, as their movement is not located in a horizontal plane.

The angle of incline of the disc is chosen to be as small as possible in order to maintain a satisfactory flow for the apparatus, whilst guaranteeing a large enough wave amplitude to achieve the sought after effect. The Applicant has established that, for a disc diameter of approximately 120 mm, a wave amplitude of between approximately 1 and 4 mm was satisfactory.

Preferably, upper side 54 and underside 55 of wedge 50 therefore form an angle comprised between 0.5° and 2°. Grating disc 2 is therefore inclined at an angle comprised between 0.5° and 2° with respect to a plane perpendicular to rotation axis 19 of said disc 2.

More preferably, the angle between upper side 54 and underside 55 of wedge 50 is comprised between 1° and 1.5°.

In the example of embodiment represented in FIG. 5, the hub 6/wedge 50/grating disc 2 unit is connected by drilled screws 51 and nails 52. Holes 53 of grating disc 2 have a profile complementary to that of the head of screws 51.

An upper side 54 and underside 55 of wedge 50 are located in two non-parallel planes. In consequence, if wedge 50 is made out of solid material, the centre of gravity of the disc 2/basket 3 unit would be shifted with respect to rotation axis 19 of said wedge 50.

It is therefore necessary to perform balancing operations for the disc 2/basket 3 unit in order to compensate for this shift in the centre of gravity. Preferably, this balancing is performed by creating hollows in the elements of the disk 2/basket 3 unit, which are constituted from high density material such as metal. For hygiene reasons, it is preferable to fill in these hollows with a less dense material such as plastic. Hollows 56 (FIG. 1) are for example created on lower collar 7.2 of basket 3, and then filled in with plastic parts. They enable the centre of gravity of the disc 2/basket 3 unit to be positioned on rotation axis 19 of said disc 2/basket 3 unit.

Figure 6:
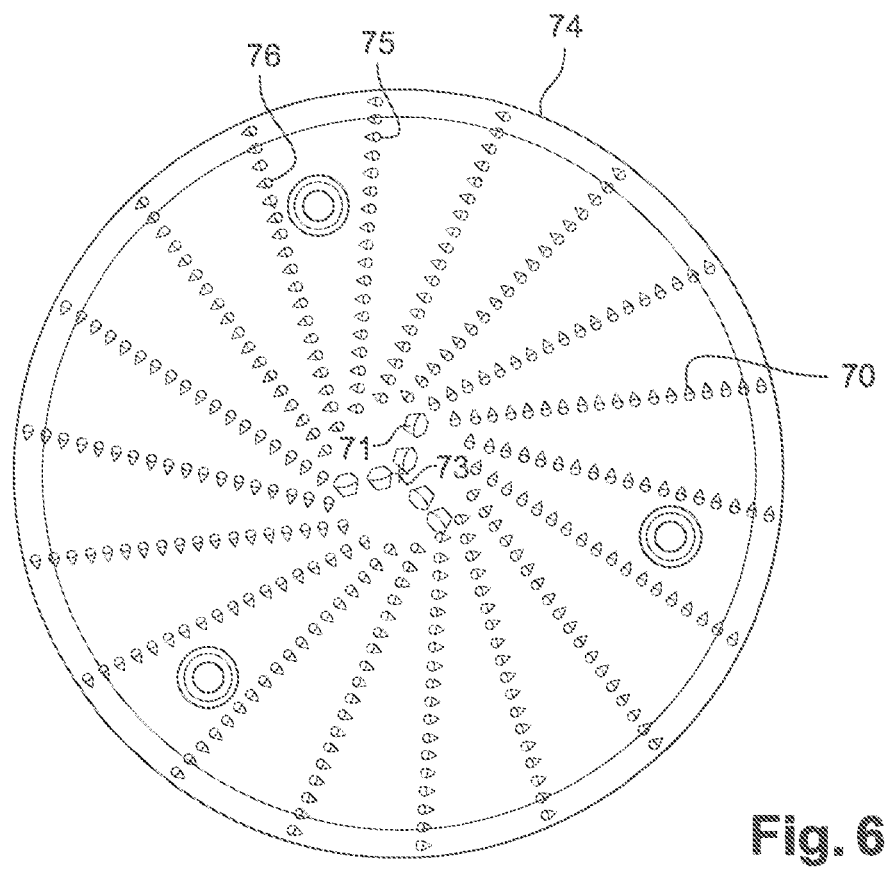
FIG. 6: a view of a grating disc according to a preferable form of embodiment of the invention.

FIG. 6 represents, from an overhead view, a preferable mode of embodiment of grating disc 2. Said disc 2 presents two types (70, 71) of grating means. Grating means 70 are constituted from teeth with small dimensions with respect to those of means 71. Means 71 are located in a part of disc 2 close to a centre 73 of said disc 2, whereas means 70 are located in a part of disc 2 close to a periphery 74 of said disc 2.

In a preferable manner, grating means 70 are substantially positioned on straight lines (75, 76) tangent to a concentric circle of grating disc 2. In a preferable manner, the radius of said circle is comprised between 10% and 20% of an average radius of grating disc 2. In a preferable manner, the number of said straight lines is comprised between 12 and 24.

In a preferable manner, grating means 71 are substantially positioned on the straight lines passing by centre 73 of grating disc 2.

Figure 7:
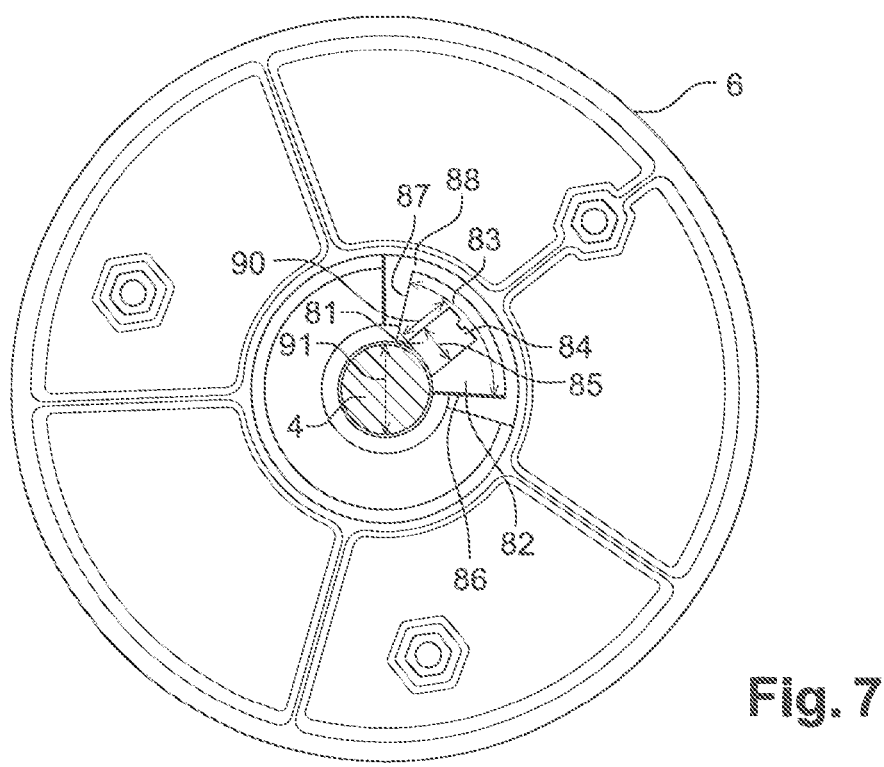
FIG. 7: a cross-sectional view of a hub/drive shaft unit according to a preferable form of embodiment of the invention.

FIG. 7 represents an overhead view of the hub 6/drive shaft 4 unit, according to a planigraphic plane perpendicular to axis 19 and passing by axis 80 represented in FIG. 1. Hub 6 is mounted onto drive shaft 4. Said drive shaft 4 has substantially the shape of a cylinder with a circular base.

Very small clearance is provided for between drive shaft 4 and a hollow of hub 6, aimed at accommodating drive shaft 4. Preferably, as shown in FIG. 1, said hollow of hub 6 substantially has the shape of a cylinder with a circular base, a length of said cylinder being comprised between 3 and 4 times the diameter of said circular base. In this manner, the drive shaft 4/hub 6 contact area is sufficiently long to not require blocking means according to rotation axis 19.

Drive shaft 4 having a circular profile, it requires a means for rotating hub 6. According to the invention, this means is comprised of a pin 81 (FIG. 7) which is positioned in a hollow 82 of hub 6. In a classic manner in the prior art, very low clearance is provided for between pin 81 and hollow 82.

However, the Applicant noticed that, when said hollow is very low, the start-up of the apparatus causes vibrations which are extremely annoying, linked to the beating of pin 81 against both parts of hollow 82.

Indeed, in the example of an electrical supply in sinusoidal current, the engine torque can also vary in time in a sinusoidal manner. This variation generates the beating of pin 81 in hollow 82, which is the origin of the vibrations.

In a surprising manner with respect to the solutions used in the prior art, the invention has resolved this problem by increasing the size of hollow 82. Indeed, according to the invention, hollow 82 has a shape such that a length 83 of an arc that an external end 84 of pin 81 can draw in rotation in hollow 82 is equal to at least double a width 85 of said external end 84 of pin 80.

In this manner, pin 81 rotates hub 6 by pushing on an edge 86 of hollow 82. When the engine torque has a sinusoidal component, pin 81 periodically loses contact with edge 86. According to the invention, length 83 of the arc of hollow 82 is sufficiently significant so that the trajectory of pin 81 in said hollow 82 does not reach the other edge 87 of hollow 82. In consequence, pin 81 is prevented from beating against both parts of hollow 82 when the apparatus is in operation.

According to the invention, a minimum length 83 of an arc that an end 84 of pin 81 can draw in hollow 82, therefore depends on an amplitude of a sinusoidal component of the torque driving drive shaft 4.

When pin 81 beats against the two edges (86, 87) of hollow 82, significant vibrations can be generated by the resonating parts of the apparatus. In any event, when the pin only beats against one edge 86 of hollow 82, this beating can also provoke vibrations, although less significant.

To reduce these vibrations, a preferable form of the invention provides for hub 6 comprising an elastomer insert 88, said insert 88 forming at least one part of hollow 82.

Thus, the energy from the beatings of pin 81 in hollow 82 is partially absorbed by the elastomer insert 88, which reduces the vibrations.

In order to enable a seal ring 89 to be easily replaced, it is preferable that pin 81 is easily removable from drive shaft 4. In consequence, according to a preferable form of the invention, pin 81 comprises a means for attaching itself to drive shaft 4 in a non-permanent way, said means for example being a thread.

Preferably, a length 90 of pin 81 is comprised between 50% and 100% of diameter 91 of the circular base of the drive shaft. Preferably, width 85 of pin 81 is comprised between 50% and 80% of length 90 of said pin 81.

The invention claimed is:
1. An apparatus for extracting juice from foods comprising whole or chopped fruits and/or vegetables by grating and centrifugation, the apparatus comprising:
   a grating disc;

a basket connected to the grating disc, linked to a drive shaft, said basket comprising a filter ring and a hub; and a cover fitted with a food introduction conduit; and wherein the food introduction conduit having a cylindrical tubular shape with a circular, oval or oblong base, the food introduction conduit comprising at least one means for preventing the rotation of the foods and at least one means for pushing the foods against the grating disc, and the food introduction conduit constituted from an internal cylindrical tube and an external cylindrical tube, the two cylindrical tubes having parallel axes and being tangent to each other;

wherein said internal cylindrical tube is partially cut according to an edge serving as a support to a sequence of surfaces; and wherein said surfaces attached to an internal wall of said external cylindrical tube and said surfaces constituting a means for preventing the rotation of the foods or a means for pushing the foods against the grating disc.

2. The apparatus of claim 1, wherein said means for pushing the foods against the grating disc comprises a strip substantially turned towards the grating disc and having an edge wound in a helical manner against the internal wall of said external cylindrical tube of the food introduction conduit.

3. The apparatus of claim 2, wherein said means for pushing the foods against the grating disc comprises a surface substantially planar, substantially horizontal, located in an area of the food introduction conduit closest to the grating disc, and extending the strip with the edge wound in the helical manner.

4. The apparatus of claim 1, wherein said means for preventing the rotation of the foods comprises a strip substantially turned towards the grating disc and having an edge wound in a helical manner against the internal wall of said external cylindrical tube of the food introduction conduit.

5. The apparatus of claim 4, wherein said means for preventing the rotation of the foods against the grating disc comprises a surface substantially planar, substantially horizontal, located in an area of the food introduction conduit closest to the grating disc, and extending the strip with the edge wound in the helical manner.

6. The apparatus of claim 1, wherein said means for preventing the rotation of the food comprises a substantially planar and substantially vertical surface with an edge resting the internal wall of said external cylindrical tube of the food introduction conduit, said substantially planar and substantially vertical surface forming an angle ($\beta$) between 60° and 90° with a plane tangent to said external cylindrical tube at a level of a contact point between the edge of said substantially planar and substantially vertical surface and the internal wall of said external cylindrical tube.

7. The apparatus of claim 1, wherein the grating disc inclines with respect to a plane perpendicular to a rotation axis of the grating disc during operation.

8. The apparatus of claim 7, wherein a plane of the grating disc forms an angle between 0.5° and 2° with said plane perpendicular to the rotation axis of the grating disc.

9. The apparatus of claim 7, further comprising a wedge attached to an underside of the grating disc inclines the grating disc, said wedge having an upper side and an underside located in two non-parallel planes, said underside of said wedge being perpendicular to a rotation axis of said wedge.

10. The apparatus of claim 7, wherein the grating disc and the basket comprise metallic elements having hollows for balancing the grating disc and the basket, said hollows being filled in by a material with a lower density than said metallic elements.

11. The apparatus of claim 1, wherein said drive shaft has a substantially cylinder shape with a circular base, rotates the hub by a pin mounted permanently onto said shaft; and wherein the hub comprises a hollow for accommodating the pin and has a shape such that a length of an arc drawn by an external end of the pin in rotation in said hollow can draw is equal to at least double width of said external end of the pin.

12. The apparatus of claim 11, wherein the filter ring of the basket comprises at least two catches located above an upper part of the filter ring.

* * * * *